L. LINDEN.
APPARATUS FOR THE MECHANICAL TREATMENT OF IMPURE WATER AND OTHER LIQUIDS.
APPLICATION FILED MAY 16, 1911.

1,024,451.

Patented Apr. 23, 1912.

3 SHEETS—SHEET 1.

WITNESSES:

INVENTOR:
LUCIEN LINDEN

L. LINDEN.
APPARATUS FOR THE MECHANICAL TREATMENT OF IMPURE WATER AND OTHER LIQUIDS.
APPLICATION FILED MAY 16, 1911.

1,024,451.

Patented Apr. 23, 1912.

3 SHEETS—SHEET 2.

WITNESSES:
John H. Hoving.
F. H. Logan.

INVENTOR:
LUCIEN LINDEN
BY H. Van Dedeureel
Attorney

L. LINDEN.
APPARATUS FOR THE MECHANICAL TREATMENT OF IMPURE WATER AND OTHER LIQUIDS.
APPLICATION FILED MAY 16, 1911.

1,024,451.

Patented Apr. 23, 1912.

3 SHEETS—SHEET 3.

WITNESSES:
John H. Hoving.
F. H. Logan.

INVENTOR:
LUCIEN LINDEN

By Ivan Dedereed
Attorney

UNITED STATES PATENT OFFICE.

LUCIEN LINDEN, OF BRUSSELS, BELGIUM.

APPARATUS FOR THE MECHANICAL TREATMENT OF IMPURE WATER AND OTHER LIQUIDS.

1,024,451. Specification of Letters Patent. Patented Apr. 23, 1912.

Application filed May 16, 1911. Serial No. 627,567.

*To all whom it may concern:*

Be it known that I, LUCIEN LINDEN, citizen of the Kingdom of Belgium, residing at 117 Rue Belliard, Brussels, Belgium, have invented a new and useful Improvement in Apparatus for the Mechanical Treatment of Impure Water and other Liquids; and I do hereby declare the following to be a full, clear, and exact description of the same.

The present invention has for its object an apparatus for the mechanical purification of impure liquids, especially residuary waters or waters for industrial purposes or for consumption.

The invention will be described with reference to the apparatus shown diagrammatically in the accompanying drawings in which—

Figure 1:
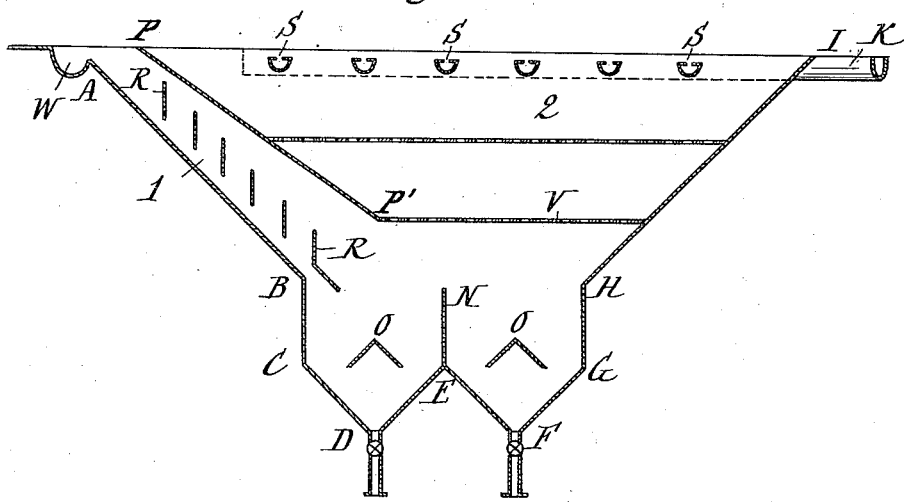
Figure 2:
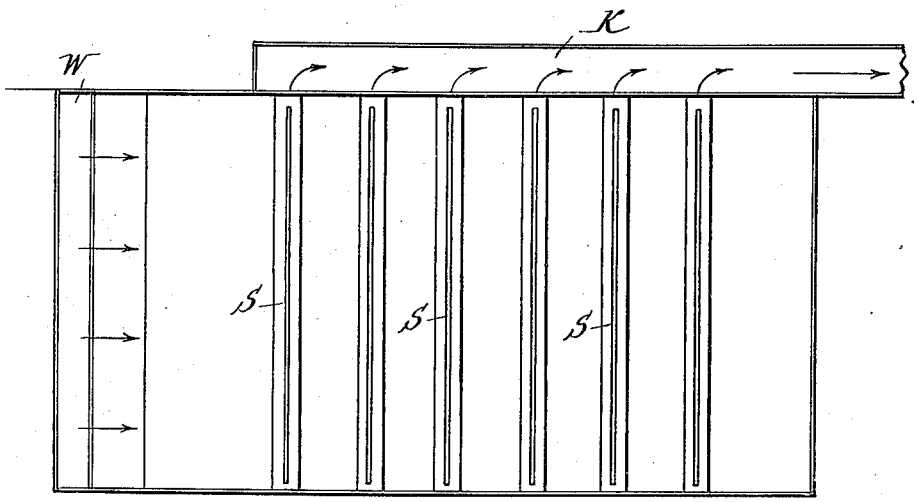
Figure 3:
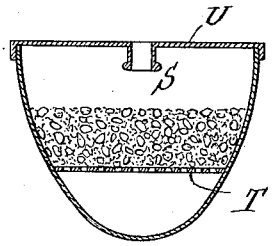
Figure 4:
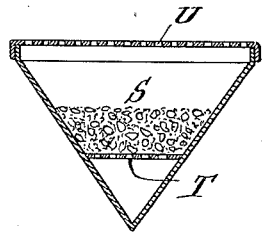
Figure 5:
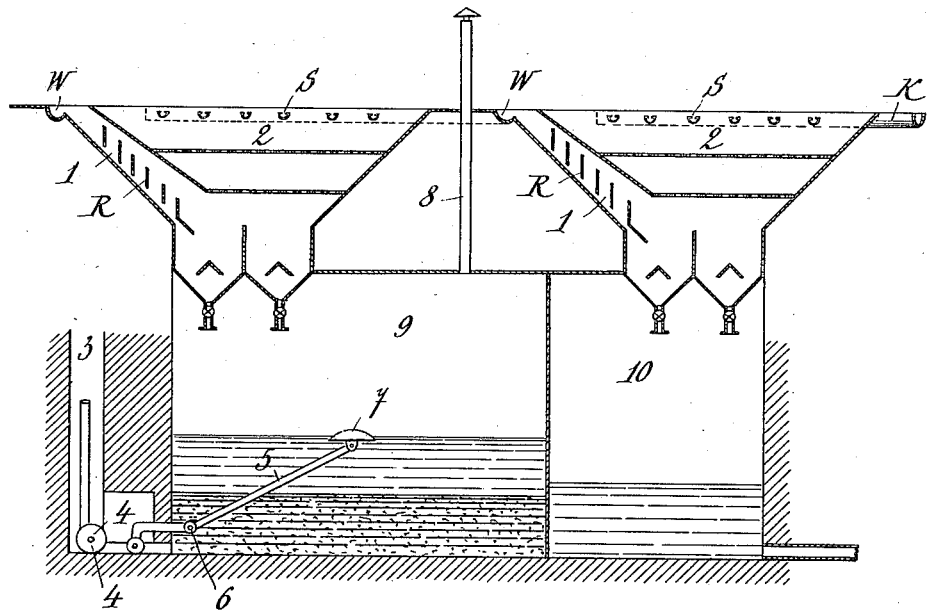
Figure 6:
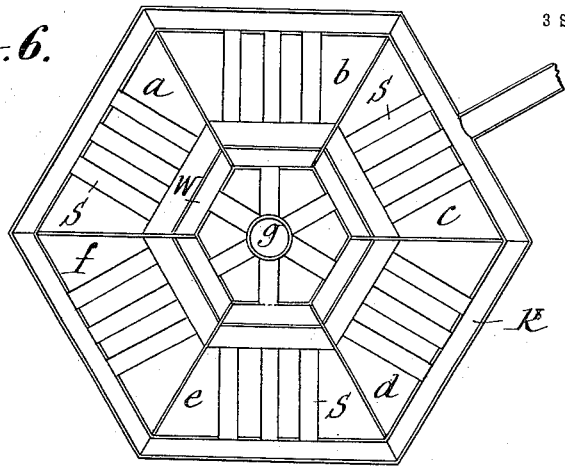
Figure 7:
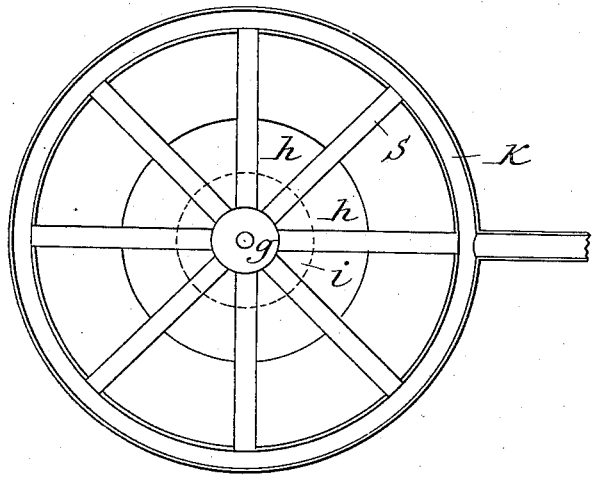
Figure 8:
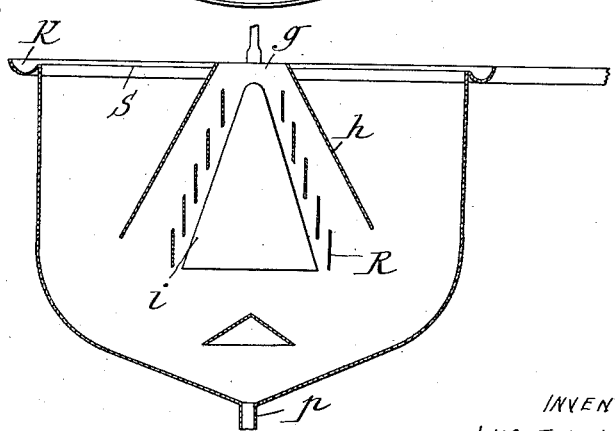

Figures 1 and 2 are respectively the longitudinal section and plan of a tank, Fig. 3 a cross section of a collecting canal or channel, Fig. 4 a modified form of collecting channel, Fig. 5 a section of a double tank, Fig. 6 a plan of a number of tanks arranged to form a polygon in plan, Fig. 7 a circularly formed tank and Fig. 8 a transverse section of the tank in Fig. 6.

The apparatus of Figs. 1 and 2 comprises a reservoir or tank having inclined walls A, B, I, H, connected with the vertical walls B C, G H of a sump B C D E F G H. The reservoir has two compartments 1, 2 separated by an inclined partition P which starting from above the level of the liquid in the reservoir diverges more and more away from the wall A B as the lower it extends. Vertical baffles R, parallel and equally spaced, are placed stepwise between the wall A B and the partition P; these baffles are each of uniform height and are preferably at the same distance from that wall so that the section of the channel for the flow of water between the baffles and the partition P gradually increases in section in the direction of flow. The lowermost baffle may be prolonged obliquely to prevent sediment rising and flowing along the wall. The bottom of the sump is formed into two or more compartments. Between the first and second—or between two others according to the inclination of the partition P—is a vertical partition N, for the purpose of retaining the sediment in the first compartment. The distances B P′, P′ N may be equal or P′ N may be greater than B P′ and P′ H greater than P′ N. At the bottom of the compartment are clearing out cocks D, F over which are mounted inverted V shape members O to prevent the rising of sediment during emptying and clearing out operations.

At the upper part of compartment 2 is a series of small horizontal parallel channels S, arranged parallel with or perpendicular to the axis of the compartment and leading to one or more external collecting gutters K. The bottoms of the channels may be given a slight slope toward the gutter or gutters. The channels may be divided horizontally into two parts by a perforated partition T (Fig. 3) of suitable material or they may be of metallic fabric; the channels are provided with a cover $u$ having a centrally or longitudinally arranged slot of appropriate dimensions, or of perforated material, metallic fabric or equivalents.

The partition T supports a bed of filtering material, for example of gravel or coke, which however does not reach to the level of the cover; alternately the partition T may be dispensed with and the filtering material be placed in the small channels themselves. The compartment 2 may be provided with one or more horizontal gratings or layers of network V to suppress any eddies that may occur and to regulate the flow. A channel W (Fig. 1) adjacent to the tank distributes the liquid to be treated along the whole breadth of the inlet to the tank, while the cocks D F control the outlets.

The operation of the device is as follows: The tank being supposed full, the liquid, water for example, flows along to the end of the channel W and passing through the inlet to the tank descends between the wall A B and partition P, its velocity gradually diminishing proportionally to the increase in the section of that channel. Most of the heavy matters, which have a tendency to descend more rapidly, come into engagement with the baffles R which cause them to descend vertically toward the wall A B from where the current carries them toward the sump at the bottom of the tank in which they collect. The sump can be divided up into several compartments. The liquid deprived for the most part of the bodies in suspension, rises toward the upper part of compartment 2, the velocity of flow diminishing more and more by reason of the splayed form imparted to the compartment in the longitudinal direction, so as to facilitate the separation of the matter remaining in suspension. As soon as the liquid has risen, freed almost entirely of the matter in suspension, to the level of the top of the collectors or small channels S, it falls through the slot or perforations of the cover on to the bed of filtering material whereby it is clarified and finally escapes by the exterior collecting channel K.

The number and size of the filter channels are calculated so that they can never be full and the filter be submerged. They have, in order to carry off toward the outlet into the channel K the clarified liquid passing from the bed without drawing off the separated matter and scum, an inclination toward the side of the tank to which the channel K is adjacent. The cover $u$ can be slotted or perforated in any manner, provided it is removable so that it can be easily lifted when the filtering matter has to be replaced or attended to. The use of coke as a filter material is very advantageous as it can be used afterward as a combustible.

The impurities accumulated in the sumps can be cleared out by means of the cocks D, F. They can be cleared out direct, or be led into a well or receptacle 9 placed below or laterally of the sump or sumps. When the liquid to be treated passes through two or more tanks, the receptacle 9 can be formed wedged-shape as indicated in Fig. 5. The bottom may be made to slope. At the bottom of the receptacle 9 (Fig. 5) is placed a pump 4 which by means of a three-way cock can empty out either the sediment collected at the bottom, or the liquid from the surface by means of a tube 5 pivoted at 6 and provided with a float 7. This liquid is returned to the entrance of the purifying tank. The sediment can be left for some time in the sump or it can be concentrated biologically little by little in a manner to occupy a very small volume and become inodorous. A vent 8 allows gases to escape.

When the sediment has thickened sufficiently it can be lifted out by bowls or shovels. It can also be withdrawn as it concentrates so as to preserve should it be desired its fertilizing properties for agricultural purposes. It can remain in the sumps where it solidifies still more; the water coming from that operation is returned to the tanks. The sediment well can also be divided into compartments in any convenient manner, to separate the sediment obtained in the first tank 9 from that of the second 10 (Fig. 5), for example in the case where one may contain chemical reagents hurtful to those in the other.

The arrangement of Fig. 6 comprises a certain number of similar tanks $a, b, c, d, e, f$, disposed to form a polygon, and supplied with liquid from the center $g$ by the conduit $w$, the flow occurring along the filtering channels S to the channel K which may be common to all the tanks. Besides the advantages resulting from the compact arrangement and economy of space, the tanks being of trapezoidal form in plan allow of a very considerable progressive reduction in the flow of the water by reason of the increase of section both in the vertical sense and in the horizontal.

A circular form represented in Figs. 7 and 8 is easily developed from a polygon with a very large number of sides, in which the partitions separating the various tanks are omitted; the entry of the water will always be central between two co-axial cones $h, i$ and the baffles R will be annular rings. The filtering channels S can be disposed radially and the collecting channel K will be concentric therewith. The cleaning outlet pipe $p$ can be placed at the bottom of the tank.

Having thus described my invention, what I claim and desire to secure by Letters Patent is:

1. Apparatus for the mechanical treatment of impure water or other liquids, comprising a tank for the descending water, the section of which increases from top to bottom, a second tank for the rising water, the section of which increases from bottom to top, and baffling means, in the first named tank, so disposed that the section left above said baffles increases in the direction of the descending flow.

2. Apparatus for the mechanical treatment of impure water or other liquid, comprising a tank the section of which increases from top to bottom, a second tank the section of which increases from bottom to top, and parallel vertically disposed baffling plates, arranged at a substantially uniform distance from the lower wall of the first named tank.

3. Apparatus for the mechanical treatment of impure water or other liquids, comprising a tank divided into two compartments by an immersed partition rising above the liquid, said partition being disposed in such a way that the section of the compartment by which the liquid descends into the tank increases from top to bottom, while the section of the compartment in which the liquid rises increases from bottom to top; parallel vertically disposed baffling plates, arranged at a substantially uniform distance from the lower wall of the first named compartment, and collecting channels, arranged at the upper part of the second named compartment, said channels having a removable perforated cover and containing a filtering medium.

In testimony whereof, I have signed my name to this specification in the presence of two subscribing witnesses.

LUCIEN LINDEN.

Witnesses:
M. GERBEAULT,
G. ROOSEVELT PHELAN.